United States Patent [19]

Burt et al.

[11] Patent Number: 4,698,843

[45] Date of Patent: Oct. 6, 1987

[54] METHOD FOR COMPENSATING FOR VOID-DEFECTS IN IMAGES

[75] Inventors: Peter J. Burt; Edward H. Adelson, both of Mercer County, N.J.

[73] Assignee: RCA Corporation, Princeton, N.J.

[21] Appl. No.: 766,932

[22] Filed: Aug. 19, 1985

[51] Int. Cl.$^4$ .............................................. B06K 9/40
[52] U.S. Cl. .................................... 382/54; 358/166; 364/723; 364/724; 382/41; 382/49; 382/55
[58] Field of Search ............... 364/723, 724, 725, 572, 364/825; 358/133, 160, 166; 382/17, 22, 41, 43, 49, 50, 54, 55

[56] References Cited

U.S. PATENT DOCUMENTS

| | | | |
|---|---|---|---|
| 3,737,855 | 6/1973 | Cutaia | 382/54 |
| 3,887,762 | 6/1975 | Uno et al. | 358/101 |
| 3,973,239 | 8/1976 | Kakumoto et al. | 382/54 |
| 4,000,399 | 12/1976 | Kawahara | 382/54 |
| 4,010,446 | 3/1977 | Kawa | 382/55 |
| 4,447,886 | 5/1984 | Meeker | 364/725 |

OTHER PUBLICATIONS

Peter J. Burt et al., "A Multiresolution Spline With Applications to Image Mosaics", Jun. 1983, Image Processing Laboratory, Electrical, Computer, and Systems Engineering Department, Rensselaer Polytechnic Institute, Troy, New York.

Primary Examiner—Leo H. Boudreau
Assistant Examiner—Jose L. Couso
Attorney, Agent, or Firm—Allen LeRoy Limberg; George J. Seligsohn

[57] ABSTRACT

A multistage pyramid analyzer, modified to include extrapolation of the input to each stage, together with a pyramid synthesizer, may be used for filling in one or more void defects in an image to provide a natural looking processed image.

3 Claims, 5 Drawing Figures

METHOD FOR COMPENSATING FOR VOID-DEFECTS IN IMAGES

BACKGROUND OF THE INVENTION

I. Field of the Invention

This invention relates to an image processing method for filling in at least one void defect in a relatively high-resolution sampled original image.

II. Description of the Prior Art

One of the inventors of the present invention, Dr. Peter J. Burt, has developed an image-processing algorithm, known as the "Burt Pyramid," which is discussed in some detail in several articles that are listed in U.S. Pat. No. 4,674,125, filed Apr. 4, 1984, by Carlson et al., and assigned to the same assignee as the present invention (the subject matter of this U.S. Pat. No. 4,674,125 being incorporated by reference herein). This copending application has matured into U.S. Pat. No. 4,674,125 issued June 16, 1987 and entitled "Real-Time Hierarchal Pyramid Signal Processing Apparatus". One of the articles listed in U.S. Pat. No. 4,674,125, which is of particular interest in connection with the present invention, is: "A Multiresolution Spline with Applications to Image Mosaics," by Peter J. Burt et al., Image Processing Laboratory, Electrical, Computer, and Systems Engineering Department, Rensselaer Polytechnic Institute, June, 1983. Also incorporated by reference is the subject matter of U.S. Pat. No. 4,661,986, filed May 18, 1984, by Adelson, entitled "Improved Depth-of-Focus Imaging Processing Method," which is also assigned to the same assignee as the present application. U.S. Pat. No. 4,661,986 makes use of the Burt Pyramid for the purpose of synthesizing a relatively large depth-of-focus two-dimensional image of a three-dimensional scene from two or more differently focussed, separate, relatively small depth-of-focus two-dimensional images of this three-dimensional scene.

SUMMARY OF THE INVENTION

The present invention is directed to a technique, which may employ the Burt Pyramid, for filling in one or more void defects in an image in a manner which is capable of providing a more natural looking processed image than was heretofore possible. More particularly, the present invention is directed to an image processing method for filling in at least one void defect in a relatively high-resolution sampled original image, in which the image occupies a region of n-dimensional space, where n is an integer having a value of at least 1, and a void defect is comprised of a plurality of contiguous zero-valued samples occupying a certain sub-region of the region. The result is that the perimeter of the void sub-region forms a boundary between the zero-valued samples of the void sub-region and image-defining valued samples surrounding the void sub-region. Further, the sample density of the sampled image in each dimension thereof is relatively high.

The method of the present invention comprises three steps. The first step comprises employing the image-defined valued samples surrounding a void sub-region to derive therefrom extrapolated-valued samples and replacing only those zero-valued samples that form the perimeter of the void sub-region with the extrapolated-valued samples. The result is to derive a modified image in which the sub-region of zero-valued samples is reduced in size and the perimeter of the reduced-size void sub-region has a perimeter that is situated a single sample distance from the perimeter of the void sub-region prior to the replacement. The second step is comprised of low-pass filtering and sub-sampling the modified image to derive a lower resolution sampled image to have a sample density in each dimenstion thereof which is one-half of that of the modified image. The third step comprises substituting the modified image for the original image and repeating the first and second steps as many times as is required to derive a processed sampled image in which the void sub-region is completely filled in. Preferably (but not necessarily), the third step should also include employing expansion and interpolation to derive a process sampled image in which the samples have the same relatively high sample density as the original image in each dimension thereof. Usually, the number of dimensions n of the image is two, although this need not be the case.

PREFERRED EMBODIMENTS

Figure 1:
FIG. 1 illustrates a two-dimensional original image which includes a plurality of void defects spatially distributed over the region occupied by the image.
Figure 3:
FIG. 3 illustrates the image of FIG. 1 after it has been processed by the method forming the subject matter of the present invention.

Shown in FIG. 1 is a picture of a man and a woman, which has been splattered with a plurality of ink spots. These ink spots form undesired void defects in the picture shown in FIG. 1a. The effect of noise on television and other types of image transmission can also produce void defects in an image. Of course, if a void defect is both large enough and situated in a spatial position which completely obliterates a high resolution feature, such as an eye, no amount of image processing can recover the lost information about this feature. However, in most cases, there is sufficient information in the portion of the image surrounding a void defect to make it possible to "clean" the picture by filling in the void defect. The processing method of the present invention makes it possible to fill in one or more void defects in an image so well that it is virtually impossible to discern from the processed image that such void defects were ever present. For instance, in the processed image shown in FIG. 3, there is no trace of the ink spot void defects shown in the original picture of FIG. 1.

The image processing method of the present invention can be carried out in non-real time employing a digital computer, or, alternatively, it can be carried out in delayed real time by apparatus of the type disclosed in the aforesaid copending patent application Ser. No. 596,817, suitably modified in the manner discussed in detail below. In either case, the original image (which, for purposes of discussion, is assumed to occupy a certain region of two-dimensional space) is a sampled image. Further, the original image is a relatively high resolution image defined by pixel samples having a relatively high sample density in each of its two dimensions. The level (gray scale) value of each pixel sample is represented by a multibit digital (e.g., eight bit) number. In FIG. 1, the picture of the man and woman is comprised of image-defining valued pixel samples, each of which has an appropriate value to represent the light intensity of that individual pixel sample at its particular spatial position in the image. However, each and every single one of the void defects of FIG. 1 is comprised solely of a plurality of contiguous zero-valued pixel samples. In practice, a void defect may be comprised of noise not having a zero value. In this case, each noise pixel sample is initially replaced by a zero-valued pixel sample prior to its being processed by the method of the present invention.

It is plain that each sub-region of the image occupied by zero-valued pixel samples of a void defect, is surrounded by image-defining valued pixel samples, Therefore, it is easy to distinguish between the zero-valued pixel samples of a void sub-region and the surrounding image-defining pixel samples of the desired image. Therefore, the spatial location of each void sub-region within the image region can be ascertained by its perimeter of zero-valued pixels that forms a boundary with the surrounding image-defining pixel samples.

Figure 2:
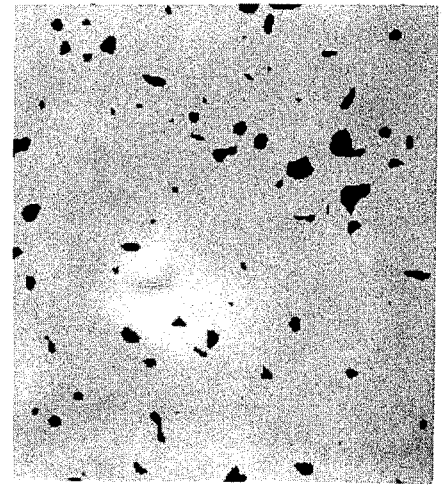
FIG. 2 is a mask defining the spatial location of each void-defect sub-region within the region occupied by the image.

FIG. 2 shows the effect of preprocessing the original image of FIG. 1 to provide a mask of the respective spatial locations of each of the ink spot void-defect sub-regions, that form the undesirable part of the original FIG. 1 image.

Figure 4:
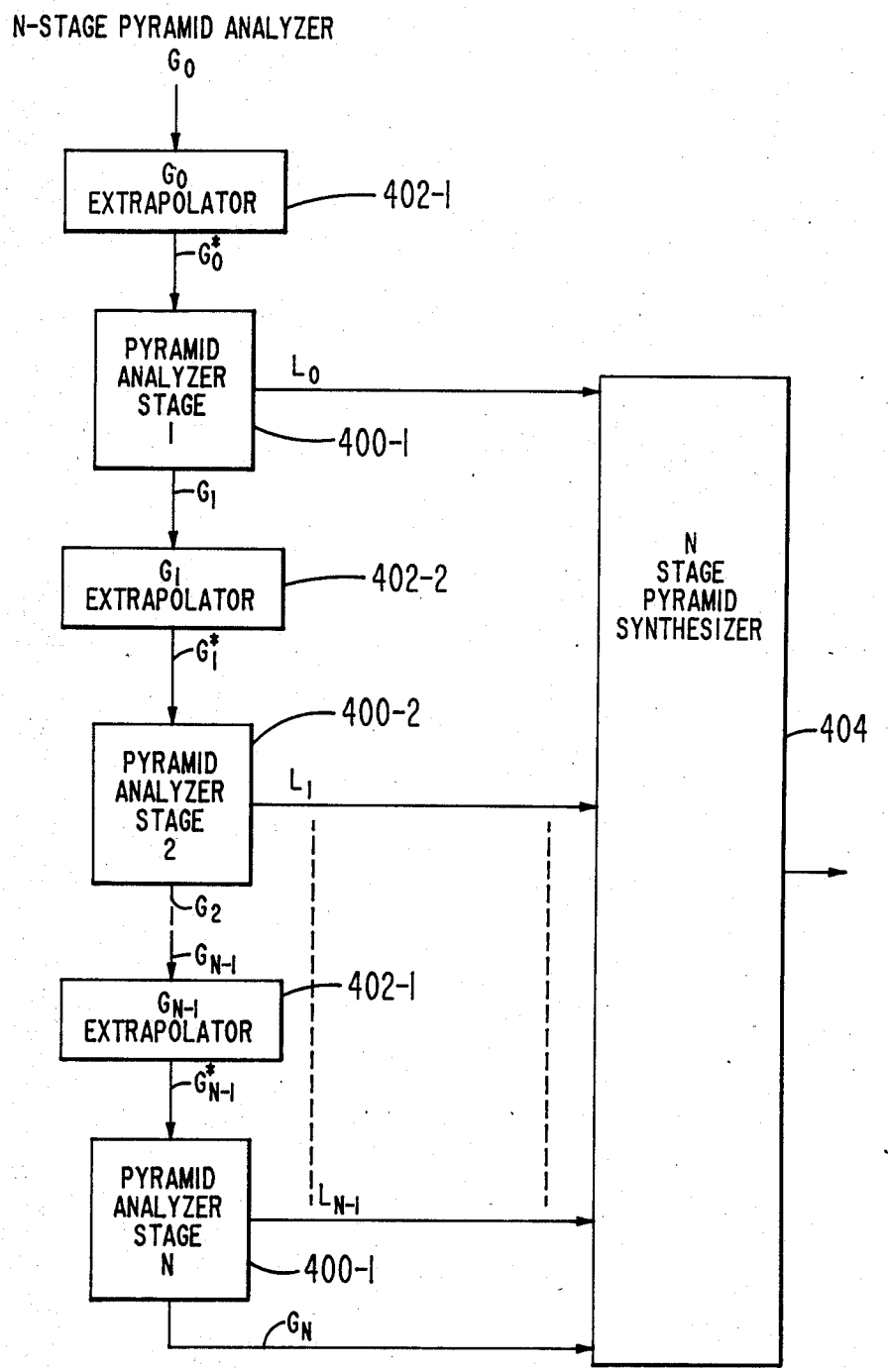
FIG. 4 is a block diagram illustrating an embodiment of the present invention.

FIG. 4 illustrates a spatial frequency spectrum analyzer of the type disclosed in the aforesaid copending patent application Ser. No. 596,817, modified in accordance with the present invention, together with a pyramid synthesizer of the type disclosed in aforesaid copending patent application Ser. No. 596,817.

As discussed in detail in copending patent application Ser. No. 596,817, a pyramid analyzer is comprised of a plurality of N (where N is a plural integer) number of cascaded stages 400-1 . . . 400N. Each stage includes a low-pass convolution filter and decimater for forwarding to the next succeeding stage a sampled signal that has had its spatial frequency in each dimension thereof reduced by substantially one octave and has had its sample density in each dimension thereof reduced by one-half with respect to the spatical frequency spectrum and sample density of its input sampled signal. At the same time, in the case of a Burt Pyramid analyzer, the output signal of each stage is passed through an expander and interpolation filter to bring its decimated sample density in each dimension thereof back to the sample density at the input of that stage, so that each expanded-interpolated sample may be subtracted from its corresponding input sample, thereby deriving a one-octave band pass sample signal.

In FIG. 4, decimated low-pass respective outputs of pyramid analyzer stages 400-1 . . . 400-N are $G_1 \ldots G_N$ and the respective band pass outputs of pyramid analyzer stages 400-1 . . . 400-N are $L_0 \ldots L_{N-1}$. For any one pyramid analyzer stage, the sum of the spatial frequency spectra of its G and its L outputs is equal to the spatial frequency spectrum of its input. However, its G output is sub-sampled (decimated) with respect to its input.

In accordance with the present invention, the N-stage pyramid analyzer is modified with respect to the analyzer disclosed in the aforesaid copending patent application Ser. No. 596,817 to the extent that an extrapolator is inserted in front of each pyramid analyzer stage. More specifically, the input sample signal $G_0$ to the analyzer (which may be a video signal defining a scanned two-dimensional television image) is applied through $G_0$ extrapolator 402-1 before being applied as an input to first pyramid analyzer stage 400-1. Thus, the input signal to pyramid analyzer stage 400-1 is not $G_0$ itself, but the extrapolated $G^*_0$. In a similar manner, the output $G_1$ from first analyzer stage 400-1 is passed through $G_1$ extrapolator 402-2, before being applied as input $G^*_1$ to a second pyramid analyzer stage 400-2. Finally, the output $G_{N-1}$ from the N-1 pyramid analyzer stage 400-(N-1), not shown, is applied through $G_{N-1}$ extrapolator 402-N before being applied as input $G^*_{N-1}$ to the Nth pyramid stage 400-N.

Each extrapolator is provided with sufficient information about the spatial location of the image-defining valued pixel samples surrounding each void defect (preferably by the preprocessed mask of FIG. 2) so that it is capable of computing an extrapolated-value for each one of only those zero-valued pixels of a void sub-region which is on the perimeter of that sub-region and forms a boundary of that sub-region with the surrounding image-defining valued pixel samples. This, extrapolation, which may be a simple linear extrapolation, extends only a single sample distance for each of extrapolators 402-1 . . . 402-N. However, for the relatively high sample density of the high-resolution defining signal $G_0$, one sample distance respresents only the small space occupied by a single pixel sample of the original high-resolution image shown in FIG. 1. However, for the lower sample density $G_1$ signal, one sample distance is twice as large in each dimension as is one $G_0$ sample distance. Additionally, one sample distance for a $G_2$ sample is four times as large in each dimension as is a $G_0$ sample, etc. Thus, the sample distance represented by the G output of succeeding pyramid analyzer stage doubles in size in each dimension with respect to that of the immediately preceding stage (i.e., the size increases exponentially). Therefore, it takes a relatively few number of pyramid analyzer stages to completely fill in even relatively large void defect sub-regions. However, it should be understood that the spatial frequency information in each dimension contained in the output from each succeeding stage is reduced by one octave with respect to its preceding stage. Thus. the extrapolated-valued samples which are used to replace the original zero-valued samples of a void defect sub-region provide more fine detail information close to the perimeter of that sub-region that they do far from the perimeter of the sub-region (i.e., towards the middle of the sub-region).

In order to smooth out the boundaries between the various extrapolated-valued sample replacements of the original zero-valued samples of the void-defect sub-region respective signals $L_0 \ldots L_{N-1}$ and the remnant signal $G_N$ are applied as inputs to N-stage pyramid synthesizer 404, which is identical in structure and function to the pyramid synthesizer disclosed in the aforesaid copending patent application Ser. No. 596,817. Synthesizer 404 includes a series of expanders, interpolators and summers for combining all of the respective inputs thereto to derive an output sample signal at the original high-sample density of $G_0$. It is the output signal from synthesizer 404 that represents the void-free processed image of FIG. 3.

The present invention requires two other modifications of the N-stage pyramid analyzer shown in FIG. 4. Specifically, it is essential that the average energy of the image-defining valued samples of the original image of FIG. 1 over the entire region occupied thereby (which contains a plurality of zero-valued pixel-sample void defect sub-regions) be made equal to the average energy of the entire region of the proessed clean image of FIG. 3 (which no longer contains any zero-valued pixel sample void-defect sub-regions). In order to accomplish this, extrapolator 402-1 further includes means for amplifying the value of each image-defining valued pixel sample, FIG. 1, by a factor equal to the ratio of the total number of samples making up the spatial region occupied by the entire image (including the void defect sub-regions) to only the number of those ones of the samples which constitute image-defining valued pixel samples (i.e., exclude the zero-valued samples of the void defect sub-regions).

Further, it is essential that the expansion and interpolation procedure employed by each Burt Pyramid analyzer store not introduce false values in its output for those particular zero-valued samples of a void defect sub-region that have as yet not been replaced by extrapolated-valued samples. Therefore, each analyzer stage reintroduces a zero-value for each of these particular samples in its L output, rather than using a value derived by the expansion and interpolation procedure.

Figure 5:
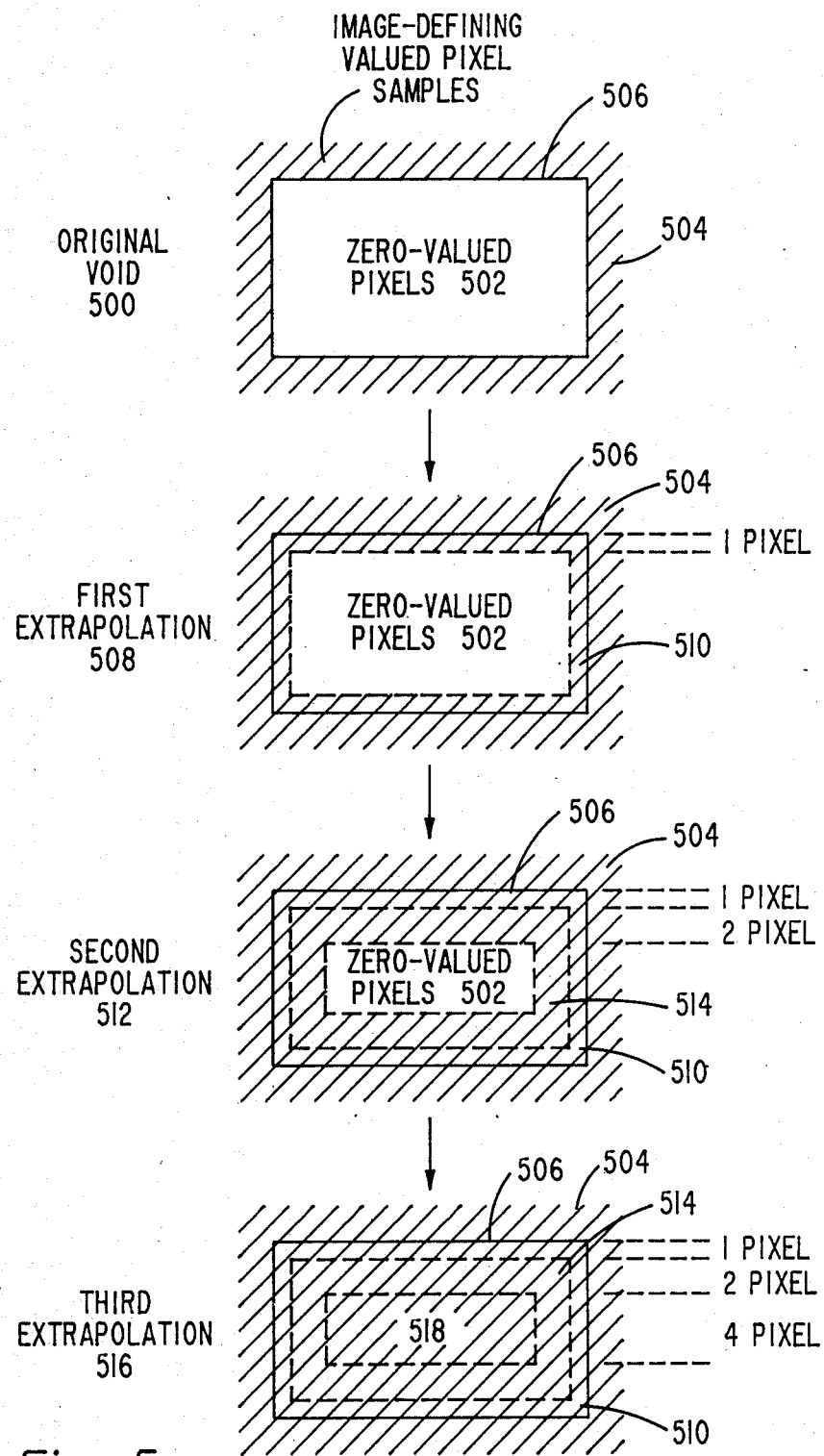
FIG. 5 is a schematic diagram that is helpful in explaining the operation of the present invention.

FIG. 5 schematically shows how a void defect is filled in by successive extrapolations. An original void defect 500, comprised of zero-valued pixel samples 502 surrounded by image-defining valued pixel samples 504 (represented by cross hatching), can be filled in by three successive extrapolations. As indicated in FIG. 5, the perimeter 506 of original void defect 500 forms a boundary between zero-valued pixels 502 of original void defect 500 and the surrounding image-defining valued pixel samples 504. The first extrapolation 508 is effective in filling in only a subset 510 of zero-valued pixels 502 that are contiguous with and in contact with perimeter 506 of original void defect 500. Thus, first extrapolation 508 replaces the zero-values of the pixel-samples of subset 510 with first extrapolated-valued samples. As indicated in FIG. 5, each of the first extrapolated-valued pixel samples extend only one pixel distance into original void defect 500. This is because they are generated directly from the relatively high-resolution, high sample density surrounding image-defining valued pixel samples. Thus, the first-interpolated valued samples of subset 510 conserve the high spatial frequency information present in the surrounding image-defining valued pixel samples.

For the second extrapolation 512, both the spatial frequency resolution and the sample density are reduced by one-half in each dimension with respect to that of first extrapolation 508. Because of this reduced sample density, each sample of second extrapolation 512 represents twice the distance in each dimension that does a pixel sample of image-defining valued pixel samples 504 surrounding original void defect 500 (or first extrapolation valued samples of subset 510). Thus, as indicated in FIG. 5, the second extrapolation-valued samples of subset 514 effectively replace (filling in) those original zero-valued pixel samples in a two-pixel deep band of pixel samples contiguous with the first extrapolation-valued pixel samples of subset 510.

In a similar manner, third extrapolation 516 is effective in filling in the entire four-pixel deep central subset 518 of original void 500 defect with third extrapolation-valued samples that have a spatical frequency resolution and sample density in each density that is one-half of that of second extrapolation 512 (or one-fourth of that of first extrapolation 508). As discussed earlier, after third extrapolation 516 is completed, expansion and interpolation techniques may be employed to bring back the sample density of that of the image-defining valued pixel samples surrounding original void defect 500 (thereby smoothing out the boundaries between respective subsets 510, 514, and 518).

The pyramid structure shown in FIG. 4 is effective in performing the operation shown in FIG. 5 for each void defect. However, it should be understood that alternative computational techniques that have an overall effect which is mathematically equivalent to that of such pyramid structure in performing the operation shown in FIG. 5 for each void defect, are also contemplated by the method of the present invention.

Most images are presented in two-dimenstional space. For this reason, two-dimensional images have been employed in describing the present invention. However, images of physical objects can occupy one-dimension or three-dimensions, in addition to two-dimensions. Further, by analogy, a temporal signal can represent a sampled information component defined by any finite number n (where n is an integer of at least one) orthogonal dimensions. The present invention is useful in filling in void defects in an information component occupying n-dimensional space, regardless of the particular value of n.

What is claimed is:

1. An image processing method for filling in at least one void defect in a relatively high-resolution sampled original image, wherein said image occupies a region of n-dimensional space, where n is an integer having a value of at least one, and said void defect is comprised of a plurality of contiguous zero-valued samples occupying a certain sub-region of said region, whereby the perimeter of said void sub-region forms a boundary between the zero-valued samples of said void sub-region and image-defining valued samples surrounding that void sub-region; and wherein said sampled original image in each dimension thereof has a given relatively high sample density; said method comprising the steps of:
   (a) employing the image-defining valued samples surrounding said void sub-region to derive therefrom extrapolated-valued samples and replacing only those zero-valued samples that form the perimeter of said void sub-region with said extrapolated-valued samples, thereby to derive a modified image in which said void sub-region of zero-valued samples is reduced in size and the perimeter of said reduced-size void sub-region has a perimeter that is situated a single sample distance from the perimeter of said void sub-region prior to said replacement,
   (b) low-pass filtering and sub-sampling said modified image to derive a lower resolution sampled image having a sample density in each dimension thereof which is one-half of that of said modified image.
   (c) substituting said lower resolution sampled image for said sampled original image and repeating steps (a) and (b) as many times as is required to derive a processed sampled image in which said void sub-region is completely filled in.

2. The method defined in claim 1, wherein step (c) further includes the step of employing expansion and interpolation to derive said processed sampled image with samples having the same given relatively high sample density in each dimension thereof as said sampled original image.

3. The method defined in claim 1, wherein n is equal to two.

* * * * *